United States Patent
Zhang et al.

(10) Patent No.: US 10,491,140 B2
(45) Date of Patent: Nov. 26, 2019

(54) PIEZO CERAMIC PLANAR MOTOR AND DRIVING METHOD THEREOF

(71) Applicant: SHANGHAI JIAOTONG UNIVERSITY, Shanghai (CN)

(72) Inventors: Junbin Zhang, Shanghai (CN); Peisen S. Huang, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 684 days.

(21) Appl. No.: 15/030,221

(22) PCT Filed: Oct. 20, 2014

(86) PCT No.: PCT/CN2014/088909
§ 371 (c)(1),
(2) Date: Sep. 2, 2016

(87) PCT Pub. No.: WO2015/055153
PCT Pub. Date: Apr. 23, 2015

(65) Prior Publication Data
US 2016/0373029 A1 Dec. 22, 2016

(30) Foreign Application Priority Data
Oct. 18, 2013 (WO) ............... PCT/CN2013/085487

(51) Int. Cl.
*H02N 2/02* (2006.01)
*G01D 5/347* (2006.01)
*H02N 2/06* (2006.01)

(52) U.S. Cl.
CPC ......... *H02N 2/028* (2013.01); *G01D 5/34715* (2013.01); *H02N 2/06* (2013.01)

(58) Field of Classification Search
CPC ...... H02N 2/028; H02N 2/0095; H02N 2/021; H02N 2/06
See application file for complete search history.

(56) References Cited

U.S. PATENT DOCUMENTS 6,459,088 B1 * 10/2002 Yasuda ................ B82Y 35/00
250/442.11
2008/0034749 A1 * 2/2008 Ukpai .................... F03G 7/065
60/527
(Continued)

FOREIGN PATENT DOCUMENTS

CN 101488371 A 7/2009
CN 101527484 A 9/2009

OTHER PUBLICATIONS

Dejima, et al., Precision Positioning of a Five Degree-of-Freedom Planar Motion Stage, Mechatronics, 2005, 15:969-987.
(Continued)

Primary Examiner — Bryan P Gordon
(74) Attorney, Agent, or Firm — Quarles & Brady LLP

(57) ABSTRACT

Provided is a piezo-actuated planar motor, comprising a planar substrate and a mover installed on the planar substrate, the piezo-actuated planar motor further comprising: at least one piezo driving leg which is disposed on said mover so as to drive said mover to move on said planar substrate omnidirectionally in the plane. Further provided is a method of driving a planar motor by using piezo driving legs, which implements three movement modes, i.e., a sliding mode, a walking mode, and a fine tuning mode. The sliding mode has the fastest speed of motion, the walking mode has a relatively slow speed of motion but has a high positioning accuracy and a high-accuracy tracking capability, and the fine tuning mode is used for the adjustment of the planar motor at a final position and has the highest positioning accuracy. The piezo-actuated planar motor of the present invention can effectively overcome the defects of a small movement range and a low speed in a conventional nano-positioning platform.

23 Claims, 15 Drawing Sheets

(56) References Cited

U.S. PATENT DOCUMENTS

| | | | |
|---|---|---|---|
| 2009/0224630 A1* | 9/2009 | Adachi | H02N 2/008 |
| | | | 310/317 |
| 2009/0267451 A1* | 10/2009 | Reynaerts | H02N 2/0025 |
| | | | 310/317 |
| 2013/0285768 A1* | 10/2013 | Watanabe | H03H 9/0222 |
| | | | 333/193 |
| 2014/0307113 A1* | 10/2014 | Ohashi | H02N 2/0055 |
| | | | 348/208.11 |

OTHER PUBLICATIONS

Kimura, et al., Design and Construction of a Two-Degree-of-Freedom Linear Encoder for Nanometric Measurement of Stage Position and Straightness, Precision Engineering, 2010, 34:145-155.

PCT International Search Report, PCT/CN2014/088909, dated Jan. 8, 2015 [English Language Translation Only].

Third Office Action issued in corresponding Chinese Application No. 2014-80057304.X dated Aug. 14, 2018, 12 pages.

Notification to Grant Patent Right for Invention in corresponding Chinese Application No. 2014-80057304.X, dated Jan. 10, 2019, 3 pages.

* cited by examiner

PIEZO CERAMIC PLANAR MOTOR AND DRIVING METHOD THEREOF

CROSS-REFERENCE TO RELATED APPLICATIONS

This application represents the national stage entry of PCT International Application No. PCT/CN2014/088909 filed Oct. 20, 2014 and claims priority to PCT International Application No. PCT/CN2013/085487 filed Oct. 18, 2013. The contents of this application are hereby incorporated by reference as if set forth in their entirety herein.

TECHNICAL FIELD

The present invention relates to the field of planar motors, in particular to a piezo-actuated planar motor and a driving method for the same.

BACKGROUND ART

A conventional planar motor has the feature of two-dimensional direct driving and has received extensive attentions in the recent years as a planar positioning device capable of achieving a high accuracy and high frequency response. With the development of science and technology, the need for a nano-positioning mobile platform increases rapidly in modern industry and scientific research, particularly in the direction of semiconductor manufacturing and micro/nano processing. These application fields generally require a nano-positioning platform to have a high positioning resolution and positioning accuracy, and also requires the platform to have a relatively large travel range of movement.

In the prior art, typical driving methods employed by developed nano-positioning platforms comprise an electromagnetic planar motor, an ultrasonic planar motor, a piezo walking platform and a piezo stick-slip platform. However, the above-mentioned driving methods have their own defects, for example, an electromagnetic planar motor requires complex motion control; an ultrasonic motor requires complex dynamic analysis on a resonant body and requires expensive friction materials; a piezo walking platform has a slow movement speed; and a piezo stick-slip platform has relatively small driving force, and has abrasion caused by a sliding friction.

SUMMARY OF THE INVENTION

The piezo-actuated planar motor of the present invention can effectively solve the above problems with a nano-positioning platform, and overcome the defects of a small movement range and a low speed in a conventional piezo ceramic mobile platform.

The present invention is achieved by the following technical solution: a piezo-actuated planar motor, comprising a planar substrate and a mover installed on said planar substrate, characterized in that said piezo-actuated planar motor further comprises: at least one piezo ceramic driving leg which is disposed on said mover so as to drive said mover to move on said planar substrate omnidirectionally in the plane.

Preferably, said planar motor further comprises a levitation device which enables said mover to levitate over said planar substrate.

Preferably, said levitation device is a magnetic levitation device or an air levitation device.

Preferably, said air levitation device is at least one air bearing.

Preferably, said planar motor further comprises a preload mechanism which generates a preload force between said mover and said planar substrate.

Preferably, said preload mechanism is a vacuum preload mechanism or a magnetic-force preload mechanism.

Preferably, said piezo ceramic driving leg comprises at least one multi-degree-of-freedom driving leg disposed on said mover, and a contact head of said multi-degree-of-freedom driving leg provides the motion of at least two degrees of freedom.

Preferably, said piezo ceramic driving leg further comprises at least one single-degree-of-freedom driving leg disposed on said mover, and a contact head of said single-degree-of-freedom driving leg provides the motion of one degree of freedom.

Preferably, said piezo ceramic driving leg comprises two multi-degree-of-freedom driving legs and two single-degree-of-freedom driving legs.

Preferably, said piezo ceramic driving leg comprises three multi-degree-of-freedom driving legs and three single-degree-of-freedom driving legs.

Preferably, said piezo-actuated planar motor comprises six multi-degree-of-freedom driving legs.

Preferably, said multi-degree-of-freedom driving leg is formed by stacking shear piezo actuators and linear piezo actuators.

Preferably, said multi-degree-of-freedom driving leg comprises at least two first piezo actuators which are combined with each other to provide the motion of a multi-degree-of-freedom.

Preferably, said single-degree-of-freedom driving leg uses a second piezo actuator, and said second piezo actuator provides the motion of a single-degree-of-freedom.

Preferably, motion control modes of said piezo-actuated planar motor include a sliding mode in which said piezo ceramic driving leg is in a state not in contact with said planar substrate.

Preferably, motion control modes of the piezo-actuated planar motor include a sliding mode in which said piezo ceramic driving leg is in a state not in contact with said planar substrate and in which said mover is in a levitation state.

Preferably, motion control modes of said piezo-actuated planar motor include a walking mode in which at least one of said piezo ceramic driving legs is in contact with said planar substrate at any moment.

Preferably, motion control modes of said piezo-actuated planar motor include a fine tuning mode in which said piezo ceramic driving legs are adjusted to achieve the fine tuning of the position of the mover while the contact between the plurality of said piezo ceramic driving legs and said planar substrate remains unchanged.

Preferably, said piezo-actuated planar motor further comprises a position feedback system.

Preferably, said position feedback system uses a planar encoder or a laser interferometer.

Preferably, said planar encoder comprises a reading head and a planar reference component, said planar reference component being installed on said planar substrate;

said reading head being installed on said mover and moving along with said mover, and said reading head being used to acquire information about said planar reference component so as to obtain the position of said mover on said planar substrate.

Preferably, said planar encoder comprises a reading head and a planar reference component, said planar reference component being installed on said mover and moving along with said mover, said reading head being installed on said planar substrate;

and when said mover moves, said reading head being used for acquiring position information about said planar reference component so as to acquire the position of said mover on said planar substrate.

Preferably, said planar reference component of said planar encoder employs an optical grating, a display device or a substrate with periodic patterns.

The present invention further provides a method for driving a piezo-actuated planar motor, characterized in that said piezo-actuated planar motor is as stated above, and said driving method drives said mover to move on said planar substrate omnidirectionally in the plane by using at least one piezo ceramic driving leg.

Preferably, said driving method further comprises: levitating said mover over said planar substrate using a levitation device.

Preferably, said driving method further comprises: generating a preload force between said mover and said planar substrate using a preload mechanism.

Preferably, said driving method comprises the following motion control modes: a sliding mode, a walking mode or a fine tuning mode.

Preferably, in said driving method, the system automatically selects a motion control mode according to a distance between a current position and a target position as well as the requirements of mover positioning accuracy.

Preferably, said driving method comprises an open-loop control method or a closed-loop control method which adopts said position feedback system.

The positive effects of the present invention lie in: a piezo-actuated planar motor is provided and is used for nano-positioning and can effectively overcome the defects of a conventional nano-positioning platform. Said piezo-actuated planar motor is driven by a piezo ceramic driving leg, which implements three motion control modes, i.e., a sliding mode, a walking mode, and a fine tuning mode. The sliding mode has the fastest speed of motion, the walking mode has a relatively slow speed of motion but has a high positioning accuracy and a high-accuracy tracking capability, and the fine tuning mode is used for the adjustment of the planar motor at a final position and has the highest positioning accuracy.

Said piezo-actuated planar motor has the following features: three degrees of freedom (XYθz) (θz herein indicating a rotation angle in the Z direction), a large travel (the travel being only limited to the size of the substrate), a large rotation angle (capable of rotating in 360 degrees) and omnidirectional motion control can be achieved; and a nano-sized positioning resolution, multiple modes of motion (including a high-speed mode and a high-accuracy mode), a position fine-tuning function of six degrees of freedom, and relatively high steady stiffness and positioning stability are provided.

PARTICULAR EMBODIMENTS

Preferred embodiments of the present invention will be given below in conjunction with the accompany drawings, in order to illustrate technical solutions of the present invention in details.

The piezo-actuated planar motor of the present invention comprises a planar substrate and a mover installed on the planar substrate, said piezo-actuated planar motor further comprises at least one piezo ceramic driving leg disposed on the mover so as to drive said mover to move on said planar substrate omnidirectionally in the plane. The following embodiment is merely exemplary, and the number and form of the piezo ceramic driving legs are not limited by the embodiment.

In addition, said piezo ceramic driving leg comprises at least one multi-degree-of-freedom driving leg disposed on said mover, and a contact head of said multi-degree-of-freedom driving leg provides the motion of at least two degrees of freedom. Further preferably, said piezo ceramic driving leg further comprises at least one single-degree-of-freedom driving leg disposed on said mover, and a contact of said single-degree-of-freedom driving leg provides the motion of one degree of freedom.

In the following embodiment, a three-degree-of-freedom driving leg is taken as an example for said multi-degree-of-freedom driving leg, but this is not limited by the embodiment, and said multi-degree-of-freedom driving leg can also use a driving leg with a plurality of degrees of freedom such as a two-degree-of-freedom driving leg or a four-degree-of-freedom driving leg, which can also implement the solution of the present invention.

Figure 1:
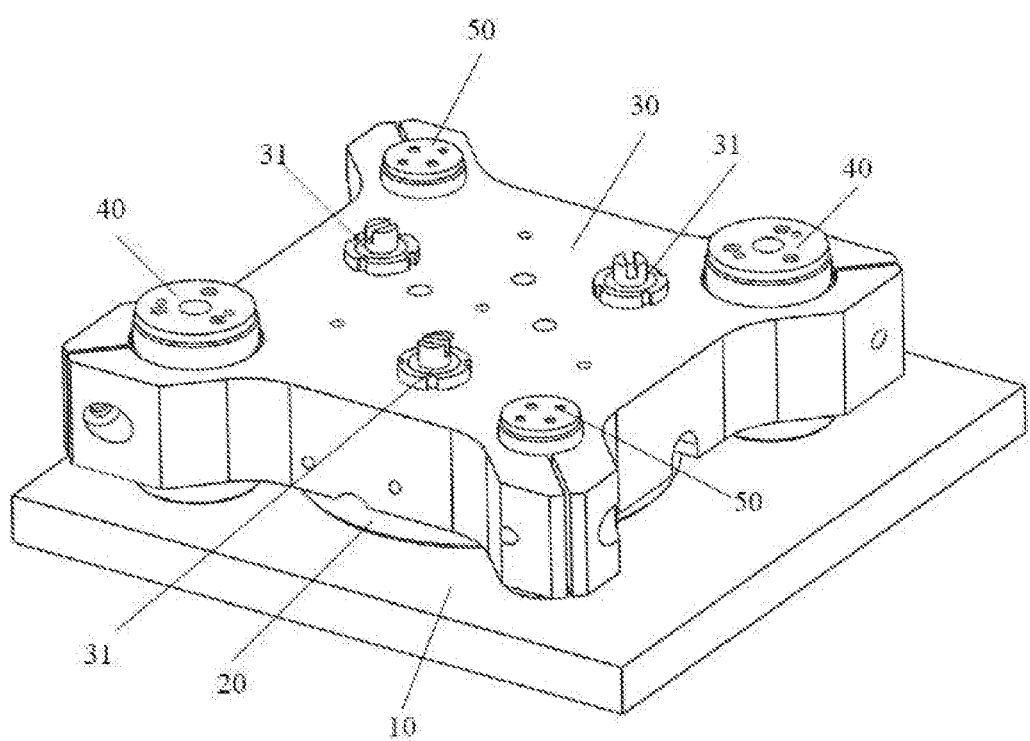
FIG. 1 is an overall schematic structural view of a piezo-actuated planar motor of the present invention.
Figure 2:
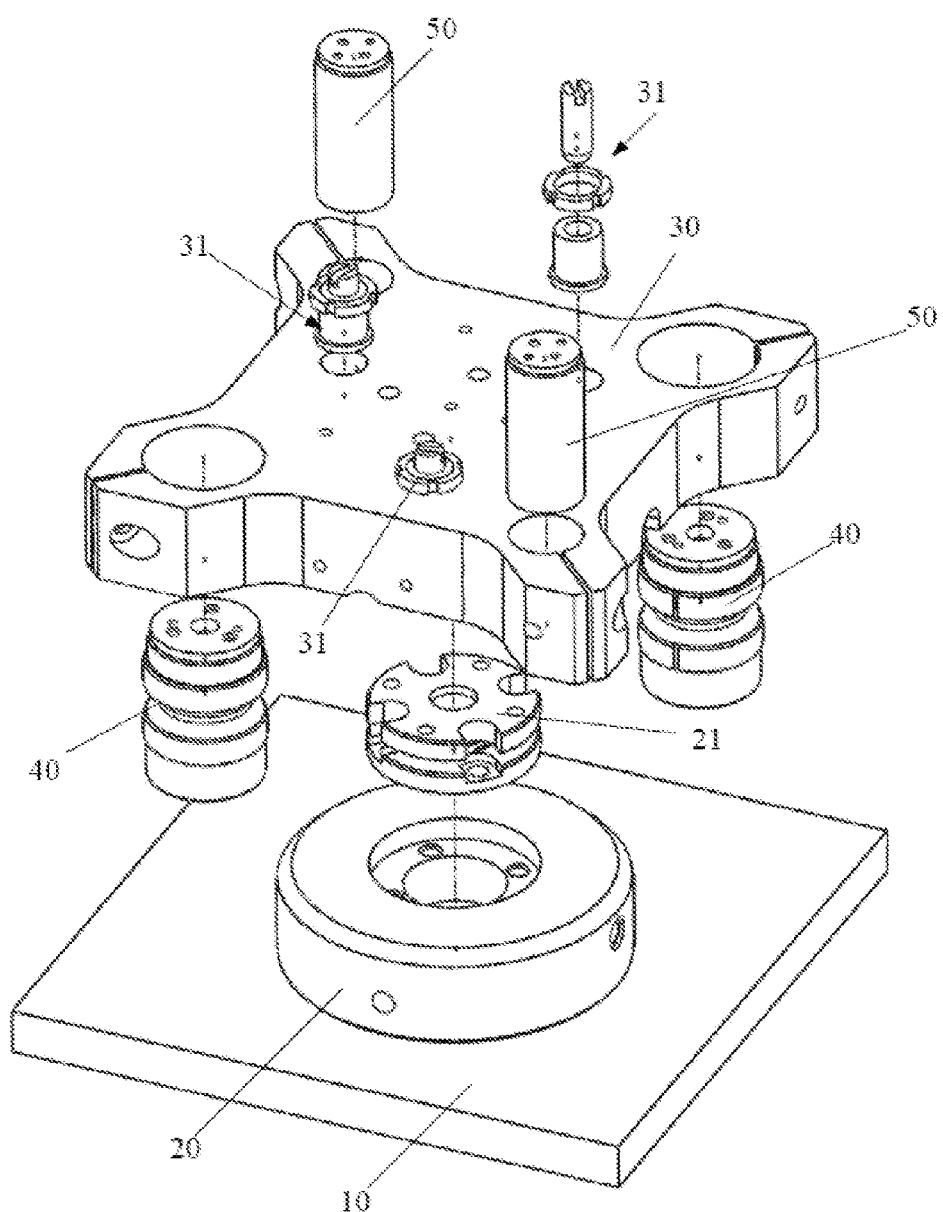
FIG. 2 is an exploded view of the piezo-actuated planar motor of the present invention.

FIG. 1 is an overall schematic structural view of a piezo-actuated planar motor of the present invention. FIG. 2 is an exploded view of the piezo-actuated planar motor of the present invention. As shown in FIGS. 1 and 2, said piezo-actuated planar motor comprises a planar substrate 10 and a mover 30 installed on the planar substrate 10. A levitation device is arranged in the central position of the mover 30, so as to enable the mover 30 to slide on the planar substrate 10. At least two three-degree-of-freedom driving legs 40 are disposed on the mover 30, and a contact of each three-degree-of-freedom driving leg 40 provides the motion of three degrees of freedom.

In particular, said piezo-actuated planar motor further comprises at least two single-degree-of-freedom driving legs 50 disposed on the mover 30, and a contact of each single-degree-of-freedom driving leg 50 provides the motion of one degree of freedom.

Preferably, as shown in FIGS. 1 and 2, said levitation device is at least one air bearing 20. The air bearing 20 can provide vacuum preload, and achieve dynamic equilibrium with the buoyancy force of the air bearing by providing vacuum adsorption force in the middle position of the bearing, so that the air bearing 20 can levitate the mover 30 over the planar substrate 10 in high stiffness and stability. The air bearing 20 is installed on the mover 30. For example, the air bearing 20 is connected to the mover 30 via a flexible hinge 21, and several fine tuning screws 31 are evenly distributed around the flexible hinge 21 and are used to adjust a pitch angle, a roll angle and a height position of the mover 30.

Figure 3:
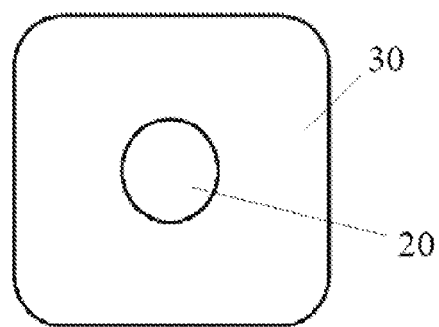
FIG. 3 is a first schematic arrangement view of an air bearing in the piezo-actuated planar motor of the present invention.
Figure 4:
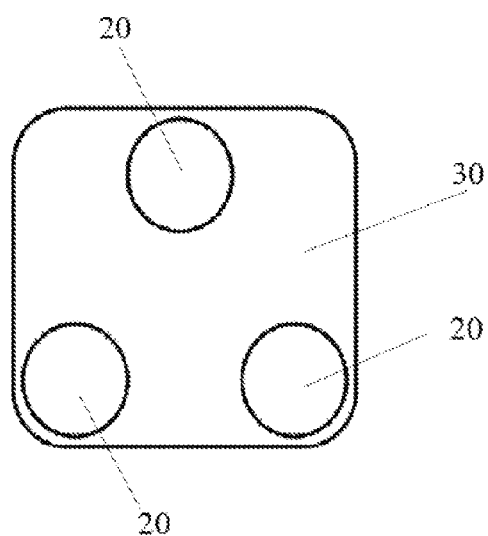
FIG. 4 is a second schematic arrangement view of air bearings in the piezo-actuated planar motor of the present invention.
Figure 5:
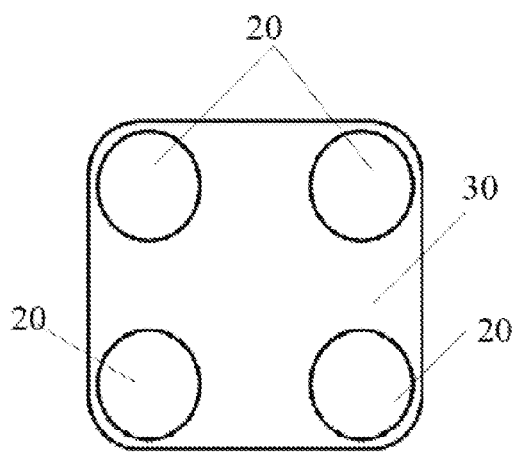
FIG. 5 is a third schematic arrangement view of air bearings in the piezo-actuated planar motor of the present invention.

The above-mentioned air bearing 20 can be arranged on the mover 30 in various ways. For example, FIG. 3 is a first schematic arrangement view of an air bearing in a piezo-actuated planar motor of the present invention. FIG. 4 is a second schematic arrangement view of air bearings in the piezo-actuated planar motor of the present invention. FIG. 5 is a third schematic arrangement view of air bearings in the piezo-actuated planar motor of the present invention. As shown in FIG. 3, said levitation device selects an air bearing 20, and the air bearing 20 is disposed in the central position of the mover 30. As shown in FIG. 4, said levitation device uses three air bearings 20, and the air bearings 20 are disposed on the mover 30 and can form various arrangements, such as a triangle as shown in FIG. 4. As shown in FIG. 5, said levitation device uses four air bearings 20, and the air bearings 20 are disposed on the mover 30, such as being disposed at vertex corners of the mover 30. The number and arrangement of the air bearings 20 mentioned above are not limited to the above examples, and other similar ways can also implement the technical solution of the present invention.

In addition, said levitation device can also use a magnetic levitation mechanism, and said magnetic levitation mechanism generates a levitation force to levitate the mover 30 over the planar substrate 10 so as to move the mover 30 omnidirectionally in the plane.

Figure 6:
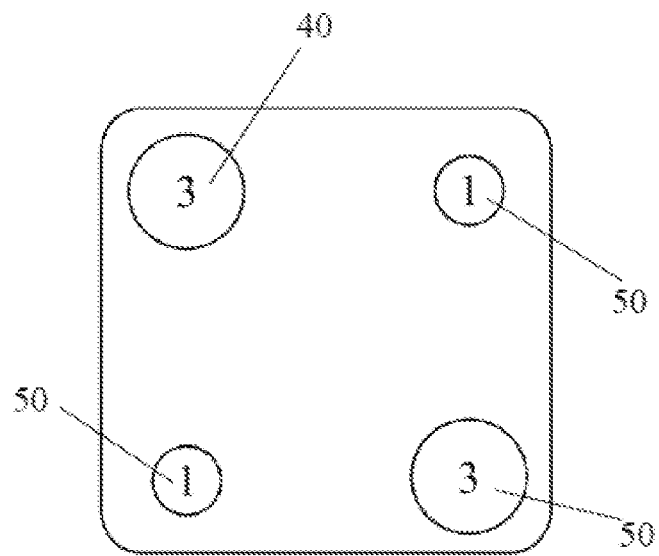
FIG. 6 is a first schematic arrangement view of three-degree-of-freedom driving legs and single-degree-of-freedom driving legs in the piezo-actuated planar motor of the present invention.

Moreover, the three-degree-of-freedom driving legs 40 and the single-degree-of-freedom driving legs 50 can be arranged in various ways. FIG. 6 is a first schematic arrangement view of three-degree-of-freedom driving legs and single-degree-of-freedom driving legs in the piezo-actuated planar motor of the present invention. As shown in FIG. 6, said piezo-actuated planar motor comprises two three-degree-of-freedom driving legs 40 and two single-degree-of-freedom driving legs 50, and the two three-degree-of-freedom driving legs 40 and the two single-degree-of-freedom driving legs 50 are respectively disposed on the mover 30. Specifically, the two three-degree-of-freedom driving legs 40 are installed at one pair of diagonal positions of the mover 30, and the two single-degree-of-freedom driving legs 50 are installed at the other pair of diagonal positions of the mover 30. Four driving legs are respectively disposed at four diagonal positions of the planar motor, and provide driving forces for the motion of the planar motor. In different motion modes, the two piezo ceramic driving legs cooperatively operate to enable the mover 30 to have a planar omnidirectional motion ability and a fine tuning ability in a six-degree-of-freedom space at a resting position. This arrangement requires few piezo actuators, and therefore the manufacturing cost is relatively low.

Figure 7:
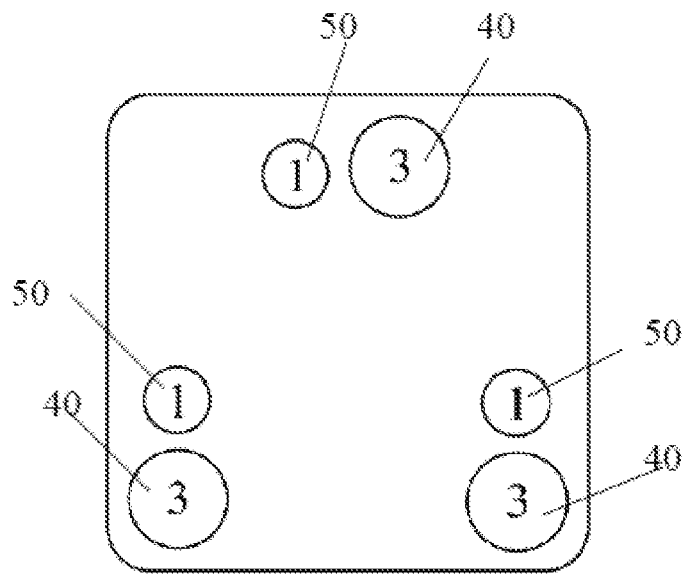
FIG. 7 is a second schematic arrangement view of three-degree-of-freedom driving legs and single-degree-of-freedom driving legs in the piezo-actuated planar motor of the present invention.

In addition to the arrangement as shown in FIG. 6, the three-degree-of-freedom driving legs 40 and the single-degree-of-freedom driving legs 50 can also be arranged in other ways. FIG. 7 is a second schematic arrangement view of three-degree-of-freedom driving legs and single-degree-of-freedom driving legs in the piezo-actuated planar motor of the present invention. As shown in FIG. 7, said piezo-actuated planar motor comprises three three-degree-of-freedom driving legs and three single-degree-of-freedom driving legs 50, and the three-degree-of-freedom driving legs 40 correspond to the single-degree-of-freedom driving legs 50 one-to-one to form three combinations of the single-degree-of-freedom driving leg 50 and the three-degree-of-freedom driving leg 40, which are respectively disposed on the mover 30. Specifically, three groups of driving legs are respectively installed at two adjacent corner positions of the mover 30 and the central position of a side away from said corner positions. This arrangement may dispense with an air bearing or a magnetic levitation mechanism, and directly use a magnet to attract the planar motor tightly on a planar base, so that the electromagnetic attraction provides for the driving leg a preload forces required for friction, and dispensing with an air bearing or a magnetic levitation mechanism has the advantage of significantly simplified the design of the system. This arrangement can also use an air bearing or a magnetic levitation mechanism, such that the motion is smoother.

Figure 8:
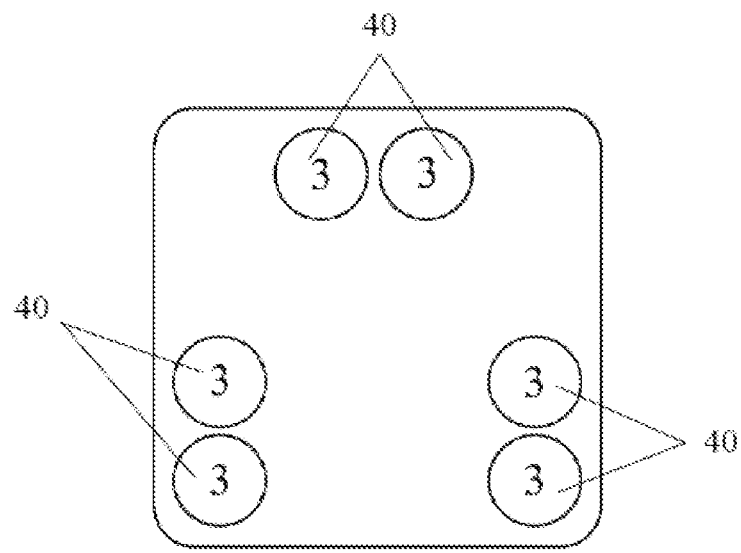
FIG. 8 is a schematic arrangement view of three-degree-of-freedom driving legs in the piezo-actuated planar motor of the present invention.

FIG. 8 is a schematic arrangement view of the three-degree-of-freedom driving leg in the piezo-actuated planar motor of the present invention. As shown in FIG. 8, said piezo-actuated planar motor comprises six three-degree-of-freedom driving legs 40, and the three-degree-of-freedom driving legs 40 are respectively disposed in pairs on the mover 30. Specifically, the three-degree-of-freedom driving legs 40 are installed in pairs at two adjacent corner positions of the mover 30 and the central position of the side away from said corner positions. The arrangement has the advantage of a large number of driving legs, so that the electric motor runs more smoothly. The arrangement can dispense with an air levitation or magnetic levitation, and the speed is also relatively fast, because the three-degree-of-freedom driving leg 40 can alternately drive the mover 30 without resting.

Figure 9:
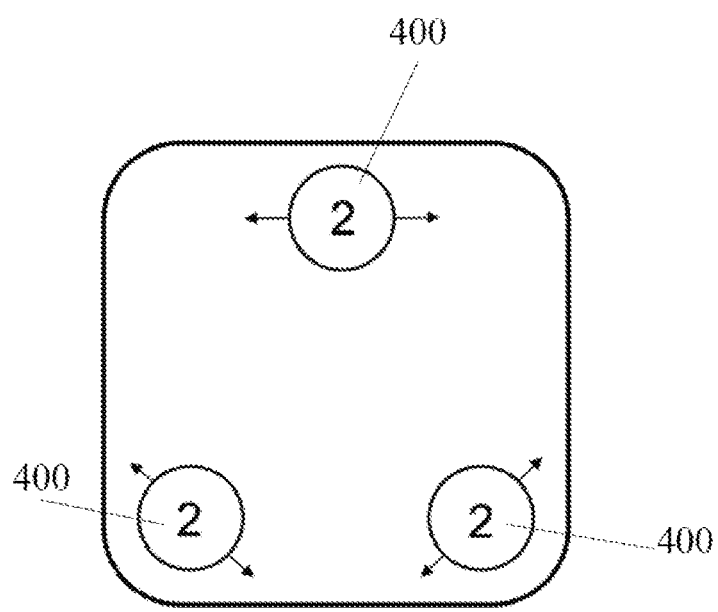
FIG. 9 is a schematic arrangement view of two-degree-of-freedom driving legs in the piezo-actuated planar motor of the present invention.

The three-degree-of-freedom driving leg 40 of the present invention can also be replaced by the two-degree-of-freedom driving leg. FIG. 9 is one of the arrangements in which the piezo-actuated planar motor of the present invention employs a two-degree-of-freedom driving legs; said solution uses three two-degree-of-freedom driving legs 400, can achieve the motion of the mover omnidirectionally in the plane, wherein two degrees of freedom of the two-degree-of-freedom driving leg are respectively swinging in the direction as indicated by the arrow in the figure and the stretching and retraction perpendicular to the direction of the planar substrate.

The number and arrangement of the three-degree-of-freedom driving legs 40, the single-degree-of-freedom driving legs 50 and the two-degree-of-freedom driving legs 400 in the above structure are not limited to the above examples, and other similar ways can also implement the technical solution of the present invention.

Figure 10:
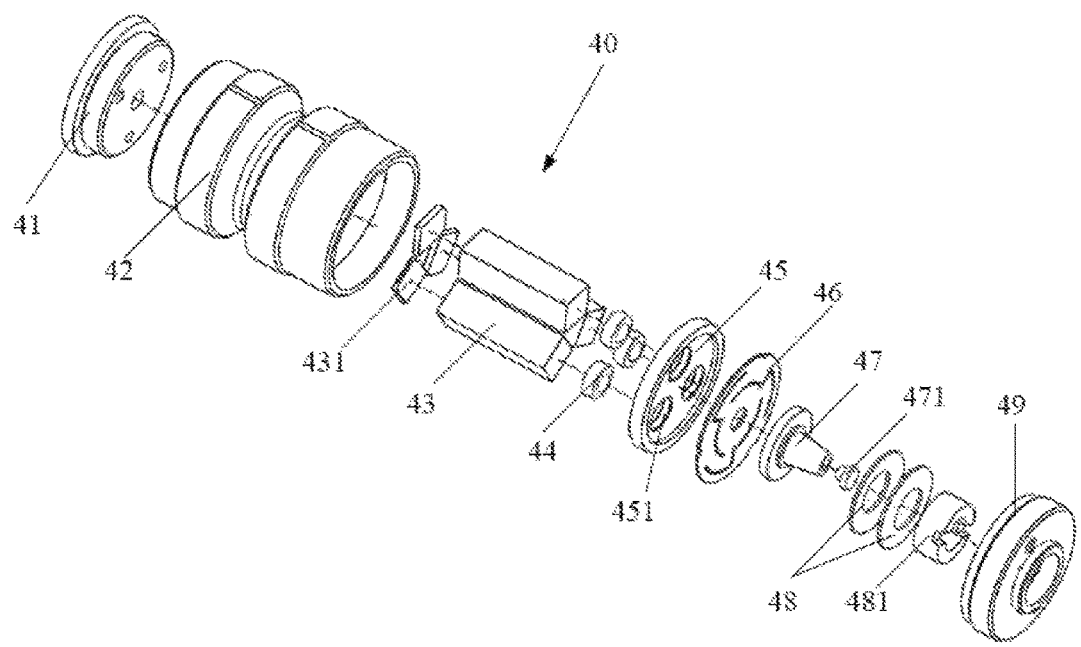
FIG. 10 is an exploded view of a three-degree-of-freedom driving leg in the piezo-actuated planar motor of the present invention.
Figure 11:
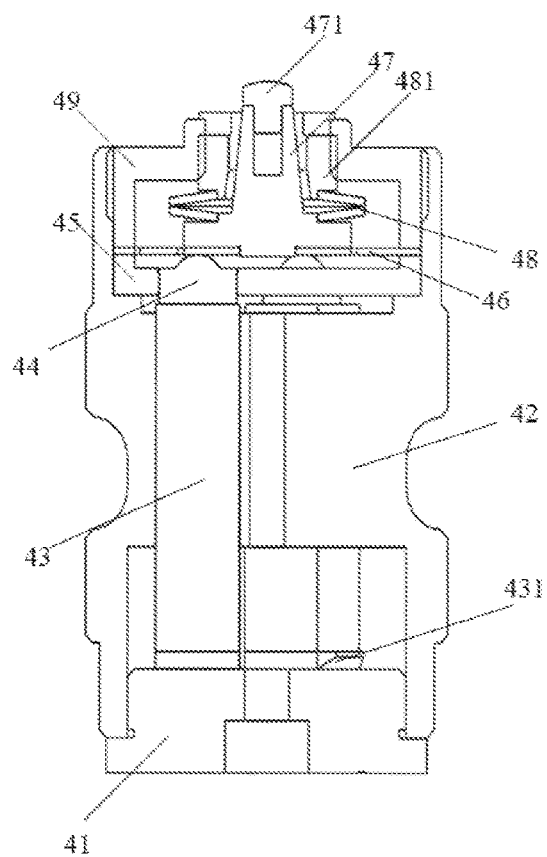
FIG. 11 is an overall schematic structural view of the three-degree-of-freedom driving leg in the piezo-actuated planar motor of the present invention.

FIG. 10 is an exploded view of a three-degree-of-freedom driving leg in the piezo-actuated planar motor of the present invention. FIG. 11 is an overall schematic structural view of the three-degree-of-freedom driving leg in the piezo-actuated planar motor of the present invention. As shown in FIGS. 10 and 11, according to the above structure, each three-degree-of-freedom driving leg 40 comprises a first base 41, a first housing 42, and three first piezo actuators 43 for providing three degrees of freedom. The bottom of each first piezo actuator 43 is uniformly and circumferentially fixed to the first base 41 via a gasket 431. The gasket 431 herein can be bonded to the first base 41 by glue or other assistant tools. The function of the gasket 431 is to protect the first piezo actuator 43 when removing the first piezo actuator 43. When removing the first piezo actuator 43, the force can be applied directly to the gasket 431 to pry off the first piezo actuator 43, rather than applying the removal force to the first piezo actuator 43. Preferably, the top of each first piezo actuator 43 can be further provided with a first round-head tip 44, the first round-head tip 44 herein has a hemispherical head, such that the force can be applied to the first piezo actuator 43 in the axial direction by the first round-head tip 44, so as to eliminate the tangential force and torque that may break the first piezo actuator 43.

At the same time, the three-degree-of-freedom driving leg 40 further comprises a three-degree-of-freedom moving head 47, a flexible mechanism, a first elastic component 48 and a pressing screw cover 49. The pressing screw cover 49 presses the three-degree-of-freedom moving head 47 and said flexible mechanism on three first piezo actuators 43 via a first elastic component 48. Said flexible mechanism can use a flexible deformation plate or a flexible metal piece. Preferably, the lower surface of the three-degree-of-freedom moving head 47 is bonded to the upper surface of the flexible plate 46, and is pressed against the first round-head tip 44 via the first elastic component 48. The three-degree-of-freedom driving leg 40 may also comprise an adjustment nut 481 for adjusting the preload force of the first elastic component 48, and the adjustment nut 481 is installed on the three-degree-of-freedom moving head 47. Of course, a guide disk 45 can also be added here preferably. Specifically, three precisely machined cylindrical grooves 451 are arranged on the guide disk 45 such that the first round-head tip 44 is correspondingly inserted in the cylindrical groove 451 for providing an accurate position of motion for the first round-head tip 44. The pressing screw cover 49 is fitted with the adjustment nut 481, such that the edge of the flexible plate 46 and the guide disk 45 as well as the first piezo actuator 43 are pressed in the first housing 42.

The three-degree-of-freedom moving head 47 is made of lightweight materials, and the lower surface of the moving head and the upper surface of the flexible plate 46 are bonded by glue. The first elastic component 48 is preferably two stacked butterfly springs, and the three-degree-of-freedom moving head 47 is pressed against three first round-head tips 44 via said butterfly springs. The flexible plate 46 is processed on a metal piece by using electric sparks. The special structure on the metal piece enables the flexible plate 46 to have a relatively large deformation ability in a specific dimension and a relatively large stiffness in other dimensions. The flexible plate 46 as shown in FIG. 2 enables the three-degree-of-freedom moving head 47 to have a relatively large deformation ability in the stretching direction and two swinging directions. Therefore, when three first piezo actuators 43 stretch and retract, three first round-head tips 44 would abut against the flexible plate 46 and the three-degree-of-freedom moving head 47, and the linear motion of the three first piezo actuators 43 is converted into stretching and two swinging motions of the three-degree-of-freedom moving head 47. Since the stretching range of the first piezo actuator 43 is relatively small, there is a need for the design of mechanical motion amplification, and the placement position of the three first round-head tips 44 and the length of the three-degree-of-freedom moving head 47 along the central axis decide the motion amplification effect of the first piezo actuator 43. If the three first round-head tips 44 are distributed in a relatively small circumferential radius, and the length of the three-degree-of-freedom moving head 47 along the axial direction is relatively long, the motion amplification effect is relatively large, and vice versa. The adjustment nut 481 is mainly used to adjust the preload force of the first elastic component 48, and the first piezo actuator 43 can only have good dynamic performance under high pressing forces. In particular, a contact head 471 is installed at the top end of the three-degree-of-freedom moving head 47, and the contact head 471 is made of a wear-resistant material so as to reduce abrasion and facilitate the subsequent replacement. In addition, the three-degree-of-freedom driving leg 40 may also dispense with the above-mentioned structural design, and instead uses a three-degree-of-freedom shear piezo actuator.

Figure 12:
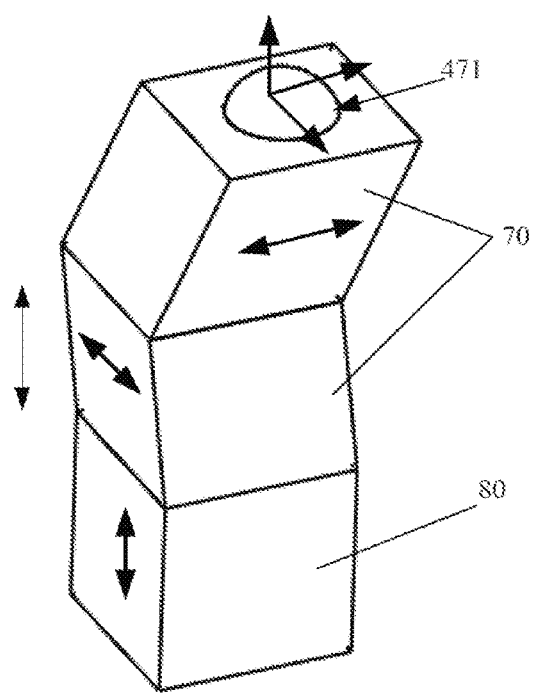
FIG. 12 is a schematic structural view of the three-degree-of-freedom driving leg in the piezo-actuated planar motor of the present invention using a three-degree-of-freedom shear piezo actuator.
Figure 13:
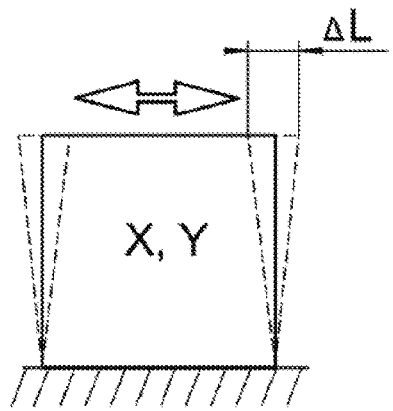
FIG. 13 is a schematic view of the principle of the shear piezo actuator of FIG. 12.

FIG. 12 is a schematic structural view of the three-degree-of-freedom driving leg in the piezo-actuated planar motor of the present invention using a three-degree-of-freedom shear piezo actuator. FIG. 13 is a schematic view of the principle of the shear piezo actuator of FIG. 12. As shown in FIGS. 12 and 13, said three-degree-of-freedom driving leg may be directly replaced by the three-degree-of-freedom shear piezo actuator. When a voltage is applied to the piezo actuator, the piezo actuator may generate a transverse displacement. Therefore, when designing the three-degree-of-freedom driving leg, two shear piezo actuators 70 and one linear piezo actuator 80 are stacked. As shown in FIG. 12, two shear piezo actuators 70 are bonded by glue, and the deformation directions of same are perpendicular to each other. When voltages are applied to the two piezo actuators, two planar motions perpendicular to each other in the X and Y directions can be achieved. The telescopic motion in the Z direction is provided by using the linear piezo actuator 80 so as to achieve the lengthening and shortening of the driving leg. The top end of said three-degree-of-freedom driving leg is installed with the contact head 471 made of wear-resistant materials so as to be in contact with the planar substrate. When the three piezo actuators deform at the same time, the driving leg can achieve the motion of three degrees of freedom. Such structure enables the design of the three-degree-of-freedom driving leg to be more concise and convenient.

Figure 14:
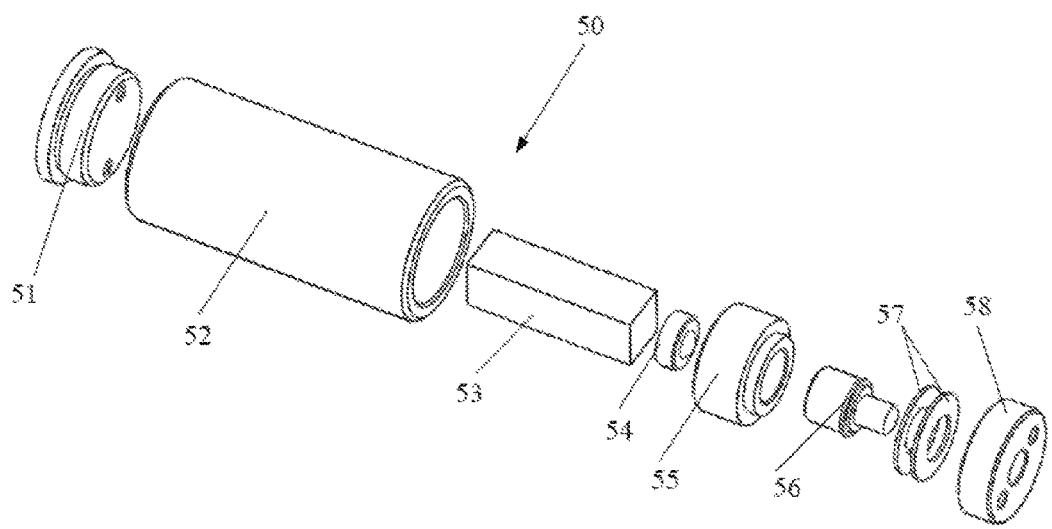
FIG. 14 is an exploded view of a single-degree-of-freedom driving leg in the piezo-actuated planar motor of the present invention.
Figure 15:
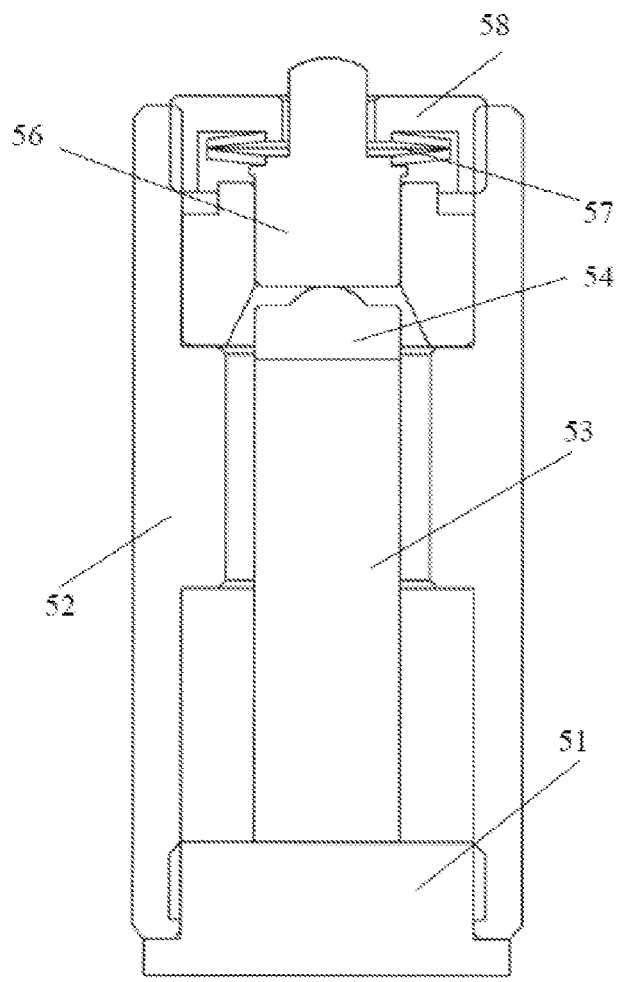
FIG. 15 is an overall schematic structural view of the single-degree-of-freedom driving leg in the piezo-actuated planar motor of the present invention.

FIG. 14 is an exploded view of a single-degree-of-freedom driving leg in the piezo-actuated planar motor of the present invention. FIG. 15 is an overall schematic structural view of the single-degree-of-freedom driving leg in the piezo-actuated planar motor of the present invention. As shown in FIGS. 14 and 15, according to the above structure, each single-degree-of-freedom driving leg 50 comprises a second base 51, a second housing 52, and a second piezo actuator 53, the second piezo actuator 53 being used for providing a degree of freedom. The bottom of the second piezo actuator 53 is installed on the second base 51. In addition, the single-degree-of-freedom driving leg 50 further comprises a single-degree-of-freedom moving head 56, a second elastic component 57 and an adjustment nut 58. The adjustment nut 58 presses the single-degree-of-freedom moving head 56 and the second piezo actuator 53 into the second housing 52 via the second elastic component 57. Preferably, the top of the second piezo actuator 53 can also be provided with a second round-head tip 5, the single-degree-of-freedom moving head 56 is arranged on the round-head tip, and the function of the second round-head tip 54 is identical to that of the first round-head tip 44. Of course, more preferably, a guide sleeve 55 can also be added here; the guide sleeve 55 is sheathed outside the single-degree-of-freedom moving head 56 and is installed inside the second housing 52, such that the single-degree-of-freedom moving head 50 can slide along the guide sleeve 55. The second elastic component 57 here is preferably two stacked butterfly springs, the single-degree-of-freedom moving head 56 is pressed via said butterfly springs, such that the pressing force is applied to the second piezo actuator 53.

When the second piezo actuator 53 stretches, the motion is transferred to the single-degree-of-freedom moving head 56. The adjustment nut 58 is installed on the second housing 52 of the single-degree-of-freedom driving leg 50 so as to adjust the preload force applied by the spring, such that the second piezo actuator 53 has better dynamic performance. The single-degree-of-freedom driving leg 50 can only provide the stretching motion of the single-degree-of-freedom moving head 56. When the second piezo actuator 53 is driven, the head portion of the single-degree-of-freedom driving leg 56 is in contact with the planar substrate 10, such that the mover 30 generates a braking effect.

According to the above-mentioned structure, the piezo ceramic motor of the present invention has three motion control modes: a sliding mode, a walking mode and a fine tuning mode. In summary, the sliding mode has the fastest speed of motion; the walking mode has a relatively slow speed of motion but has a high positioning accuracy and a high-accuracy tracking capability; and the fine tuning mode can perform fine tuning for the mover near a target position and has the highest positioning accuracy, which will be further described in detail as below.

Figure 16A:
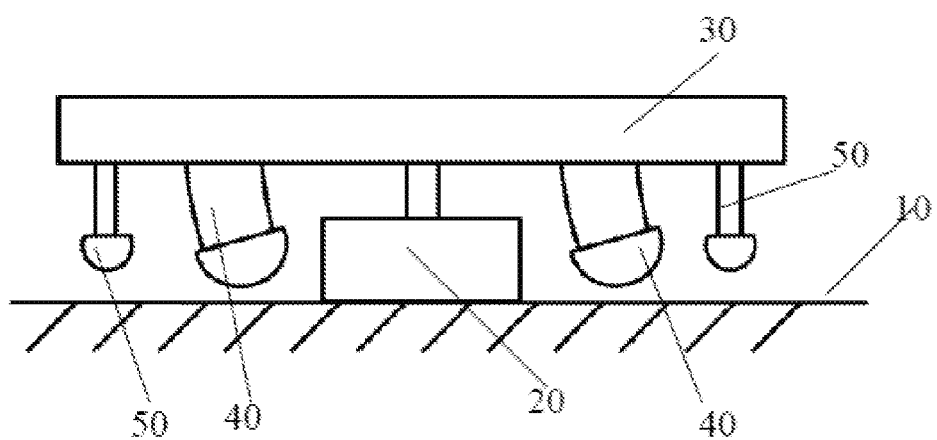
FIG. 16a is a first schematic motion view of the piezo-actuated planar motor of the present invention in a sliding mode.
Figure 16B:
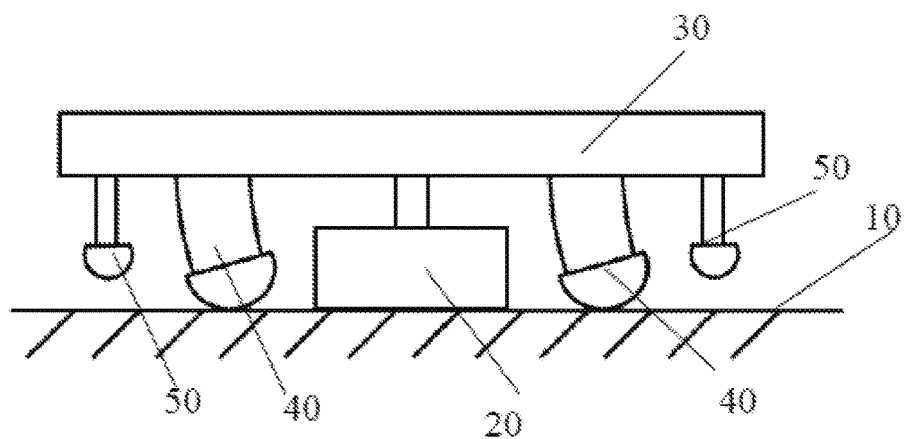
FIG. 16b is a second schematic motion view of the piezo-actuated planar motor of the present invention in the sliding mode.
Figure 16C:
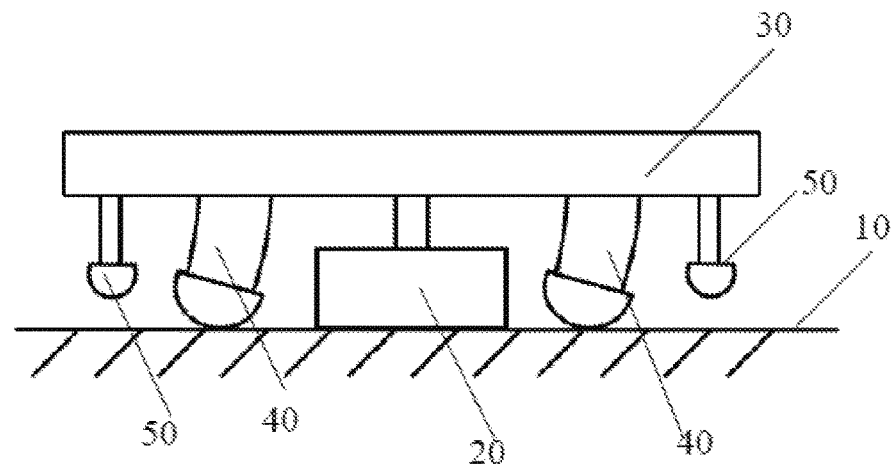
FIG. 16c is a third schematic motion view of the piezo-actuated planar motor of the present invention in the sliding mode.
Figure 16D:
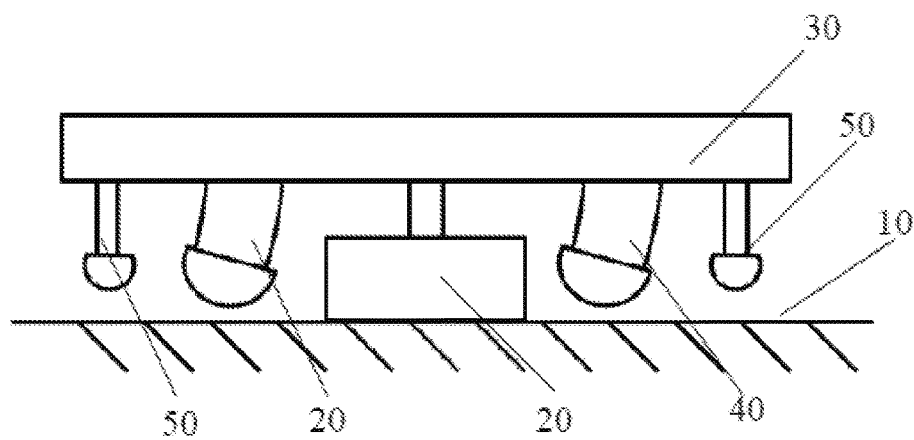
FIG. 16d is a fourth schematic motion view of the piezo-actuated planar motor of the present invention in the sliding mode.

FIG. 16a is a first schematic motion view of the piezo-actuated planar motor of the present invention in a sliding mode. FIG. 16b is a second schematic motion view of the piezo-actuated planar motor of the present invention in the sliding mode. FIG. 16c is a third schematic motion view of the piezo-actuated planar motor of the present invention in the sliding mode. FIG. 16d is a fourth schematic motion view of the piezo-actuated planar motor of the present invention in the sliding mode. In the sliding mode, two single-degree-of-freedom driving legs 50 are still in a lifted state, and two three-degree-of-freedom driving legs 40 drive the mover 30 by high-speed swinging. In such a state, the air bearing 20 has a very small resistance, thus the mover 30 can slide at a high speed on the planar substrate 10 like skiing. In said sliding mode, a sliding friction may exist between a contact of the three-degree-of-freedom driving leg 40 and the planar substrate 10, such that severe abrasion would occur. Therefore, in order to reduce the sliding friction, the acceleration of the mover 30 may be controlled in a certain range to ensure that the driving force is less than the maximum static friction force. Such a mode of motion enables the mover 30 to arrive at the target position at the fastest speed.

Figure 17A:
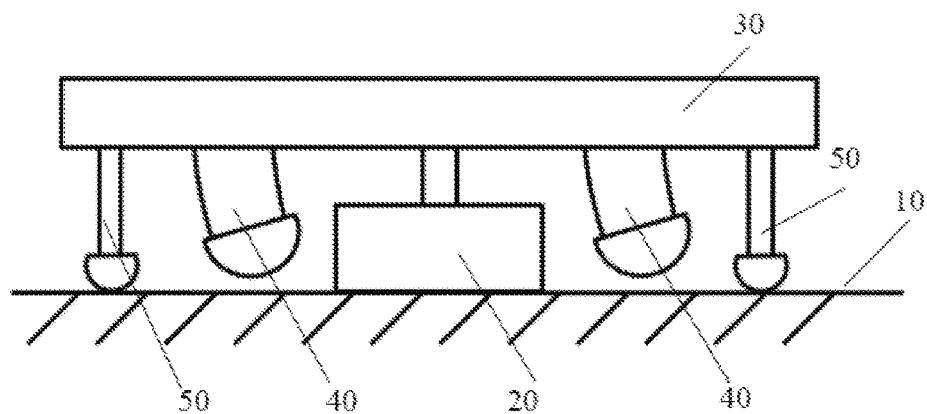
FIG. 17a is a first schematic motion view of the piezo-actuated planar motor of the present invention in a walking mode.
Figure 17B:
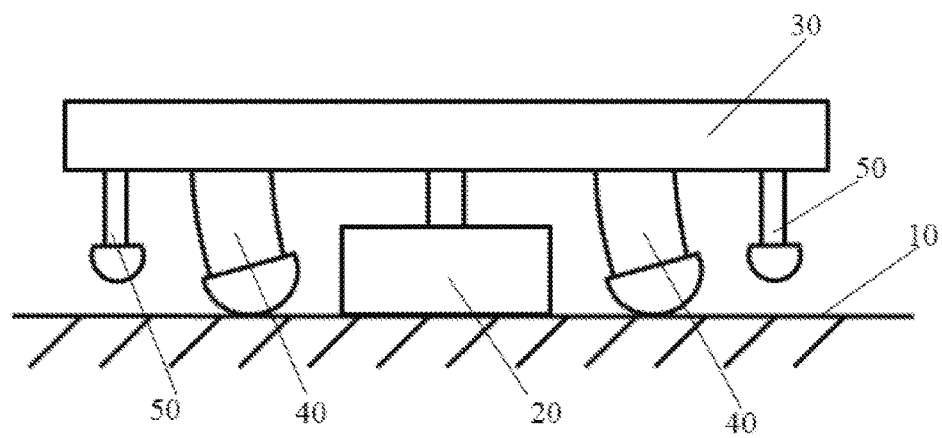
FIG. 17b is a second schematic motion view of the piezo-actuated planar motor of the present invention in the walking mode.
Figure 17C:
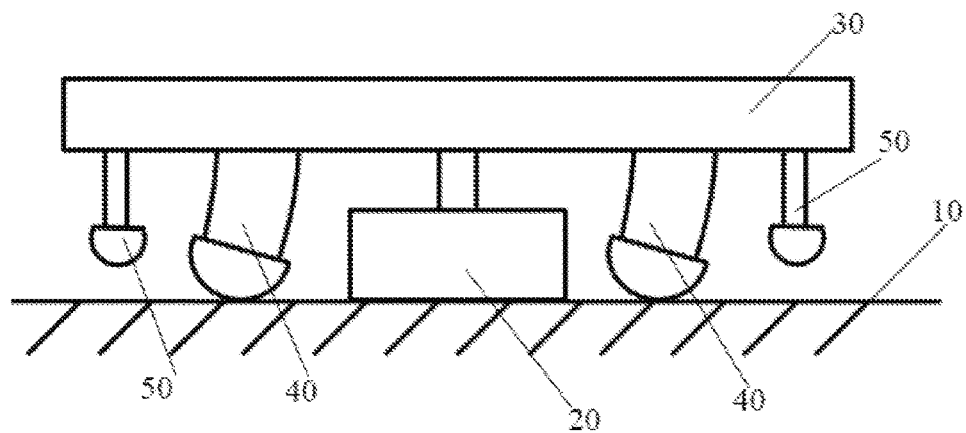
FIG. 17c is a third schematic motion view of the piezo-actuated planar motor of the present invention in the walking mode.
Figure 17D:
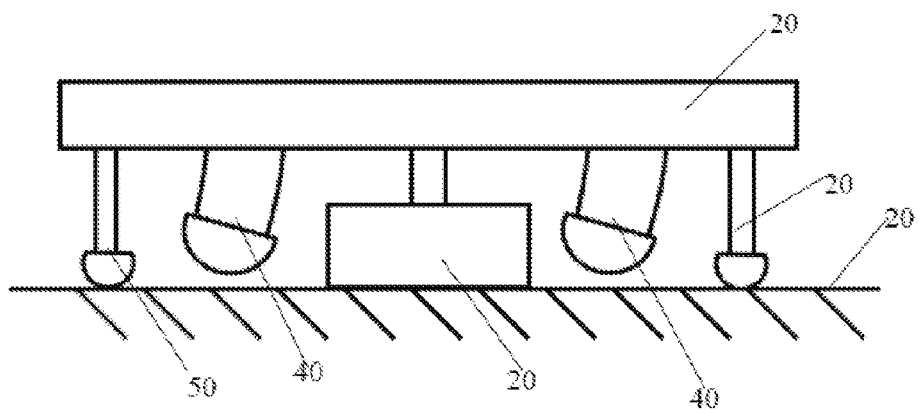
FIG. 17d is a fourth schematic motion view of the piezo-actuated planar motor of the present invention in the walking mode.

FIG. 17a is a first schematic motion view of the piezo-actuated planar motor of the present invention in a walking mode. FIG. 17b is a second schematic motion view of the piezo-actuated planar motor of the present invention in the walking mode. FIG. 17c is a third schematic motion view of the piezo-actuated planar motor of the present invention in the walking mode. FIG. 17d is a fourth schematic motion view of the piezo-actuated planar motor of the present invention in the walking mode. In the walking mode, the mover 30 performs a stepping motion as shown in FIG. 17a-17d. The single-degree-of-freedom driving leg 50 is in contact with the planar substrate 10 so as to provide a braking force, and the three-degree-of-freedom driving leg 40 is shifted on the planar substrate 10 so as to provide a driving force. As shown in FIGS. 17b and 17c, when two three-degree-of-freedom driving legs 40 push the mover 30, two single-degree-of-freedom driving legs 50 would be lifted. As shown in FIGS. 17a and 17d, when two three-degree-of-freedom driving legs 40 are lifted to prepare for the next driving, two single-degree-of-freedom driving legs 50 stretch to lock the mover 30 on the planar substrate 10. Such a movement mode can keep at least one driving leg in contact with the planar substrate 10 at any moment so as to prevent the mover 30 from being moved by external interference forces. Comparing with the above sliding mode, the walking mode may have a strong anti-interference capability and high-accuracy positioning and tracking capability.

Figure 18A:
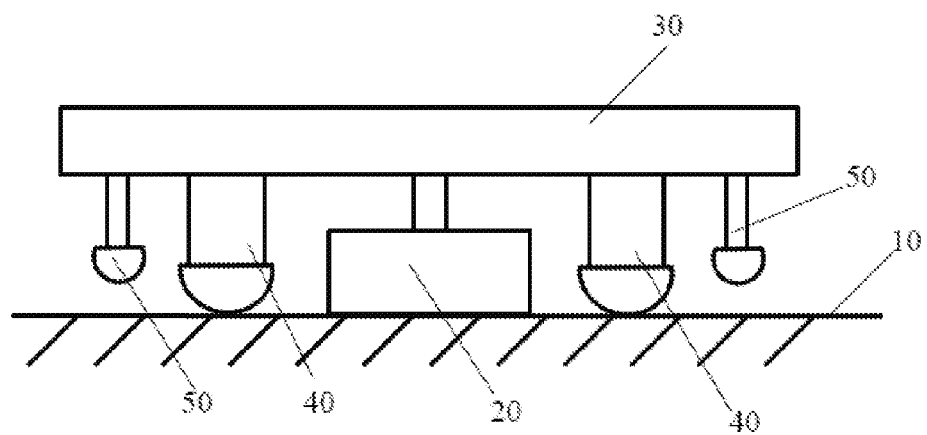
FIG. 18a is a first schematic motion view of the piezo-actuated planar motor of the present invention in a fine tuning mode.
Figure 18B:
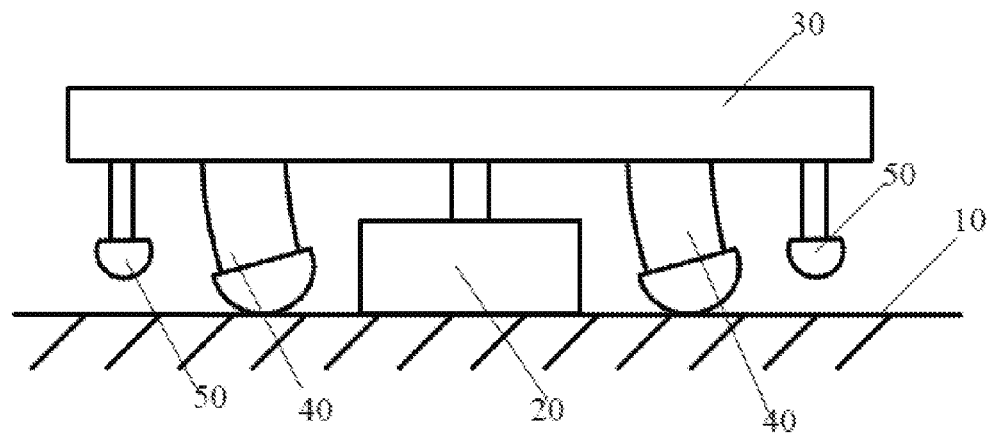
FIG. 18b is a second schematic motion view of the piezo-actuated planar motor of the present invention in the fine tuning mode.
Figure 18C:
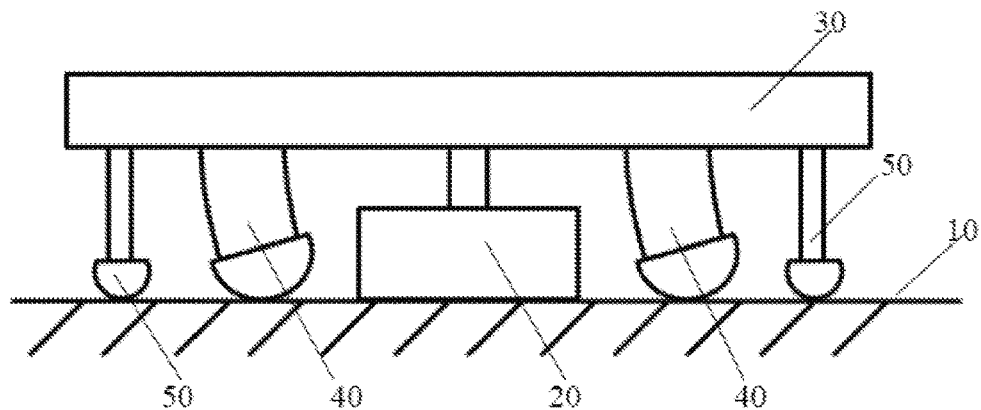
FIG. 18c is a third schematic motion view of the piezo-actuated planar motor of the present invention in the fine tuning mode.
Figure 18D:
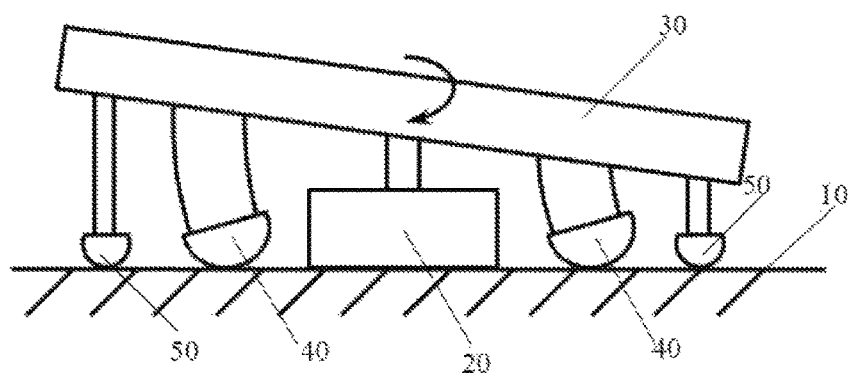
FIG. 18d is a fourth schematic motion view of the piezo-actuated planar motor of the present invention in the fine tuning mode.
Figure 19:
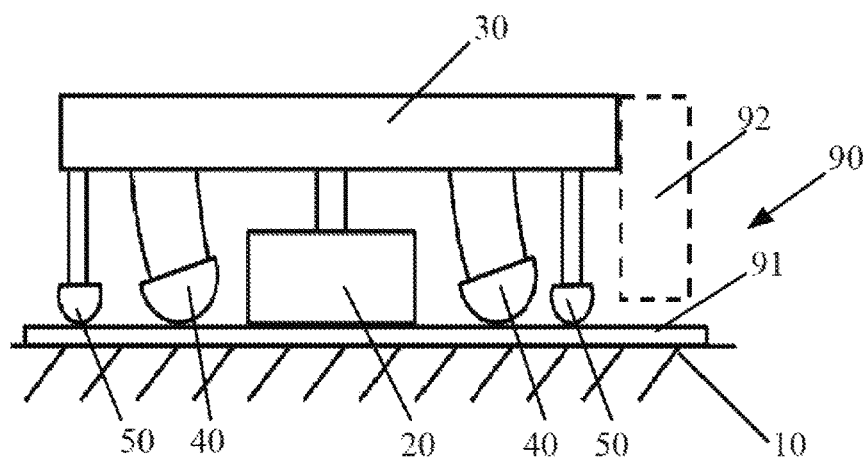
FIG. 19 is a first schematic structural view of a position sensor in the piezo-actuated planar motor of the present invention using a planar encoder.

FIG. 18a is a first schematic movement view of the piezo-actuated planar motor of the present invention in a fine tuning mode. FIG. 18b is a second schematic movement view of the piezo-actuated planar motor of the present invention in the fine tuning mode. FIG. 18c is a third schematic movement view of the piezo-actuated planar motor of the present invention in the fine tuning mode. FIG. 18d is a fourth schematic movement view of the piezo-actuated planar motor of the present invention in the fine tuning mode. In such a fine tuning mode, two three-degree-of-freedom driving legs 40 and two single-degree-of-freedom driving legs 50 adjust the spacial position of six degrees of freedom of the mover 30 by the respective first piezo actuator 43 and second piezo actuator 53. Since the first piezo actuator 43 and the second piezo actuator 53 have short travels, the adjusting range of the fine tuning mode is also relatively small. As shown in FIG. 18a-18d, the three-degree-of-freedom driving leg 40 stretches at the start and locks the mover 30, and a swinging angle of the three-degree-of-freedom moving head can be fine-tuned at a high displacement resolution provided by the first piezo actuator 43, such that the position of the mover 30 can be adjusted. Two single-degree-of-freedom driving legs 50 can also be fitted to fine-tune a pitch angle, a roll angle and a height position of the mover 30. Since two three-degree-of-freedom driving legs 40 and two single-degree-of-freedom driving legs 50 can be both in contact with the planar substrate 10, the mover 30 can maintain the optimal stability. The fine tuning mode is mainly used to fine-tune the mover 30 to the target position, which has the highest positioning accuracy, in particular suitable for a high-accuracy position control, such as lithographic mask alignment in semiconductor processing.

The basic structure of another piezo-actuated planar motor provided by the present invention is substantially identical to the above piezo-actuated planar motor, and only differs from the latter in that said planar motor in the piezo-actuated planar motor of the present embodiment uses a preload mechanism, rather than a levitation device, and said preload mechanism is installed on said mover, such that a preload force is generated between said mover and said planar substrate. Said preload mechanism is a vacuum preload mechanism or a magnetic-force preload mechanism (not shown in the figure), such that said planar motor achieves movement omnidirectionally in the plane via attraction forces between said preload mechanism and said planar substrate. The piezo-actuated planar motor of this structure is applicable to the following two cases: the driving legs of said piezo-actuated planar motor comprise three three-degree-of-freedom driving legs and three single-degree-of-freedom driving legs, and said three-degree-of-freedom driving legs and said single-degree-of-freedom driving legs are grouped in a one-to-one manner and are disposed on said planar motor; or the driving legs of said piezo-actuated planar motor comprise six three-degree-of-freedom driving legs, and said three-degree-of-freedom driving legs are disposed in pairs on said planar motor.

Figure 20:
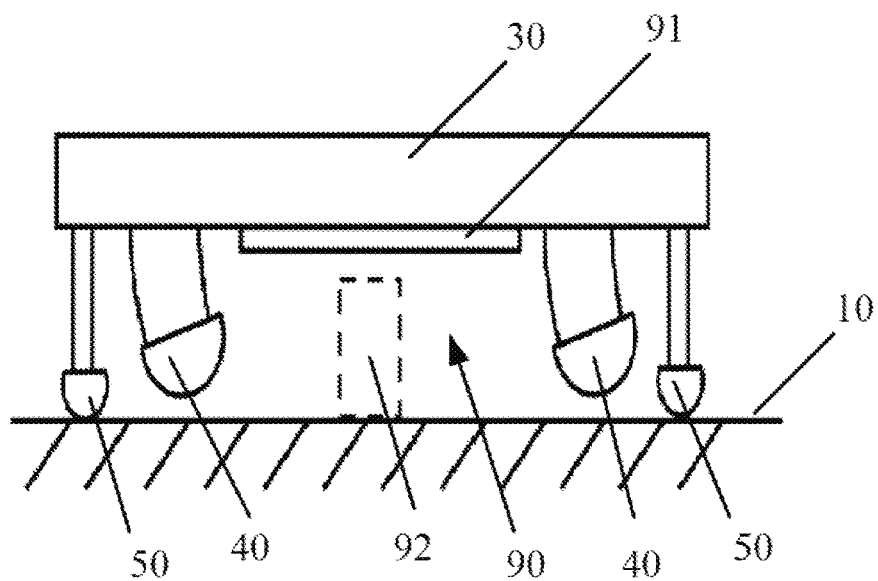
FIG. 20 is a second schematic structural view of the position sensor in the piezo-actuated planar motor of the present invention using the planar encoder.

Of course, the number and arrangement of the three-degree-of-freedom driving legs and the single-degree-of-freedom driving legs in the above structure are not limited to the above examples, and other similar ways can also implement the technical solution of the present invention. Further, said piezo-actuated planar motor further comprises a position feedback system, and said position feedback system can use a planar encoder or a laser interferometer. Taking the planar encoder as an example, FIG. 20 is a first schematic structural view of a position sensor in the piezo-actuated planar motor of the present invention using the planar encoder. As shown in FIG. 20, the position feedback system arranged in said piezo-actuated planar motor uses the planar encoder 90, wherein the planar encoder 90 comprises a reading head 92 and a planar reference component 91, and the planar reference component 91 is installed on the planar substrate 10 such that the mover 30 can move on the planar reference component 91. The reading head 92 is installed on the mover 30 and moves along with the mover 30, and information about the planar reference component 91 is collected by the reading head 92, such that the position of the mover 30 on the planar substrate 10 is obtained. The planar reference component 91 of the planar encoder 90 used here is preferably an optical grating, a display device or a substrate with periodic patterns. Further preferably, a protective layer (not shown in the figure) can also be added on the planar reference component 91.

Figure 21:
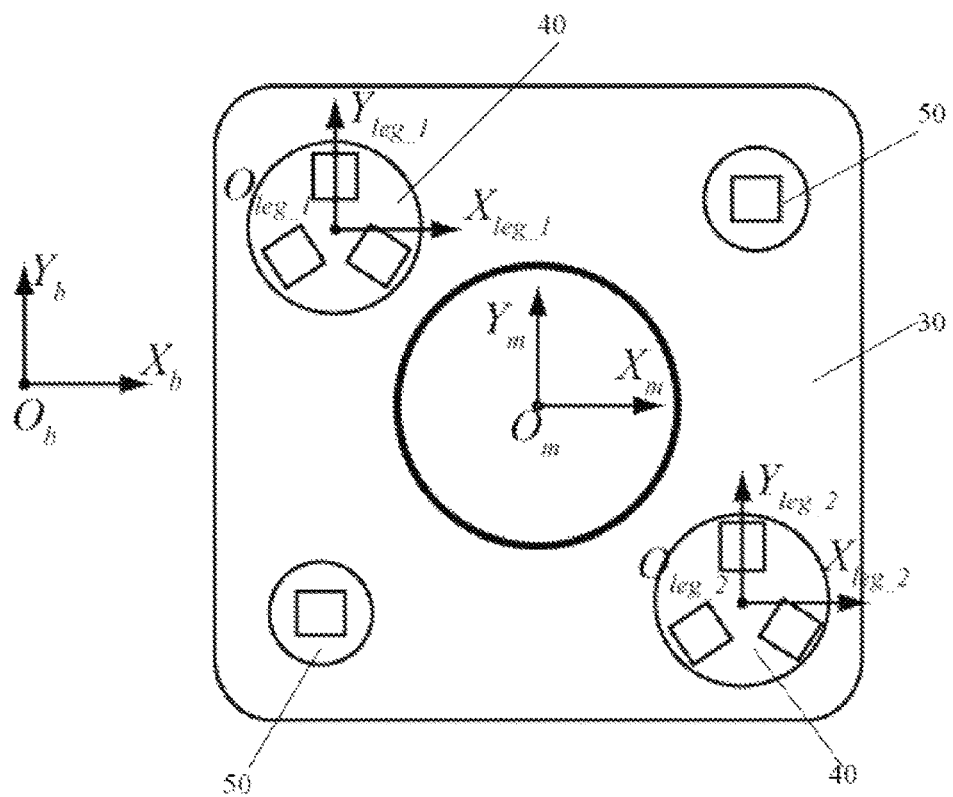
FIG. 21 is a schematic view of definition of coordinates of the piezo-actuated planar motor of the present invention.

FIG. 21 is a second schematic structural view of the position sensor in the piezo-actuated planar motor of the present invention using the planar encoder. As shown in FIG. 21, the position feedback system arranged in said piezo-actuated planar motor uses a planar encoder 90, which comprises a reading head 92 and a planar reference component 91; the planar reference component 91 is installed on the mover 30 (as shown in FIG. 21, the planar reference component 91 is arranged at the lower end of the mover 30 and opposite to the reading head 92) and moves along with the mover 30; and the reading head 92 is installed on the planar substrate 30 and opposite to the planar reference component 91. The planar reference component 91 of the planar encoder 90 used here is preferably an optical grating, a display device or a substrate with periodic patterns. When the mover 30 moves, the reading head 92 collects position information about the planar reference component 91 so as to obtain the position of the mover 30 on the planar substrate 10.

The present invention further provides a driving method of a piezo-actuated planar motor, said piezo-actuated planar motor is as stated above, and said driving method drives said mover to move on said planar substrate omnidirectionally in the plane by using at least one piezo ceramic driving leg.

Preferably, said driving method further comprises: levitate said mover above said planar substrate using a levitation device. Preferably, said driving method further comprises: generating a preload force between said mover and said planar substrate using a preload mechanism.

In addition, said driving method comprises the following motion control modes: a sliding mode, a walking mode or a fine tuning mode. Said motion control mode can be selected by a user, and can also be automatically selected by the system according to a distance between a current position and a target position as well as the requirement of a mover positioning accuracy. Said driving method further comprises an open-loop control method, or a closed-loop control method which adopts said position feedback system.

If the closed-loop control method is used, the mover 30 may read the current position of the mover 30 via a position sensor (not shown in the figure) when it starts running, and then is compared with the preset target position to obtain a required movement distance. If the motion control mode is selected by a user, the system may drive the mover to the target position in the motion control mode selected by the user. If the motion control mode is automatically selected by the system, the system may select a motion control mode according to the distance to the position of the target position and the requirement of movement accuracy. If the mover 30 is relatively far from the target position, the system may select a sliding mode to approach the target position at the fastest speed. When the mover 30 reaches within a certain range near the target position, the system may select a walking mode to approach the target at higher accuracy. Finally, when the mover 30 is within the movement range of the fine tuning mode, the system may select a fine tuning mode to finely tune the electric motor to the most accurate target position.

Once the system determines an operation mode, the processor (not shown in the figure) may generate a voltage control signal of the piezo actuator according to a control algorithm of the respective operation modes. The voltage control signal of the first piezo actuator 43 and the second piezo actuator 53 is amplified by a power amplifier so as to drive the movement of the mover 30. After the mover 30 moves for a distance, the system may re judge whether the mover 30 has arrived at a distance target position. If the distance target position is within a satisfactory range, the system may prompt that the planar motor has reached an ideal position, or otherwise a control loop is restarted.

Figure 22:
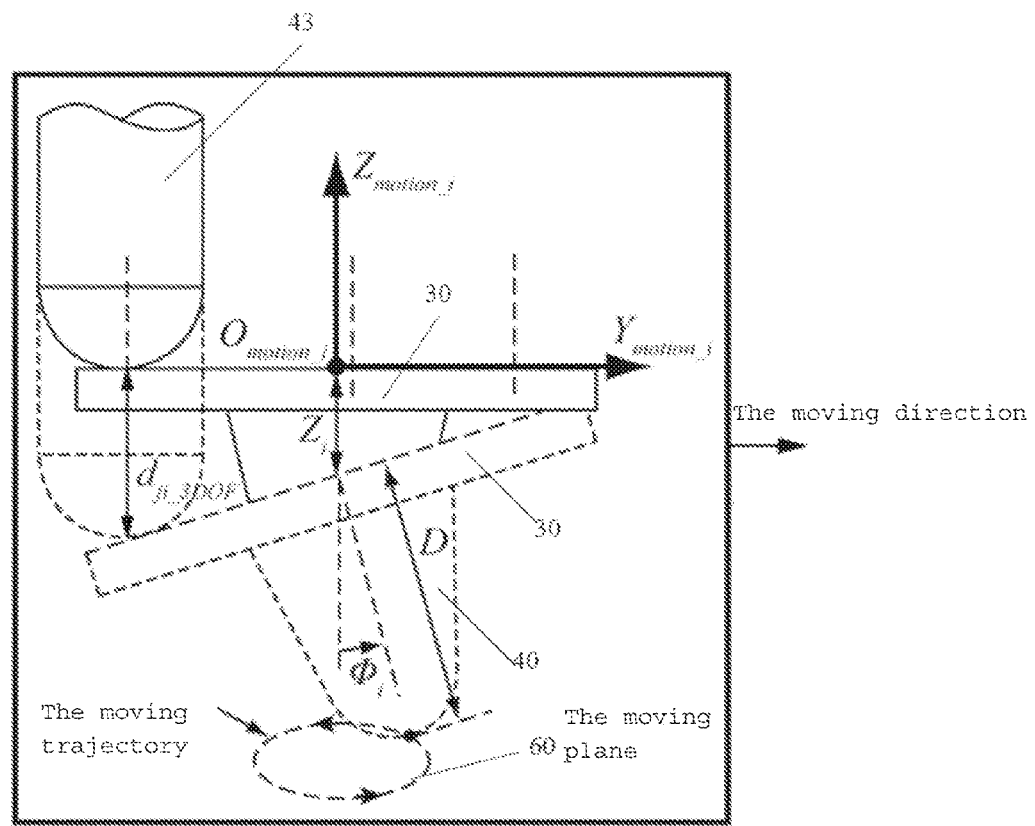
FIG. 22 is a first schematic view of definition of parameters of a three-degree-of-freedom driving leg in the piezo-actuated planar motor of the present invention.

In addition, the above-mentioned control method relates to a control algorithm of the respective movement modes. FIG. 22 is a schematic view of definition of coordinates of the piezo-actuated planar motor of the present invention. As shown in FIG. 22, four coordinate systems $O_b$, $O_m$, $O_{leg\_1}$ and $O_{leg\_2}$ are respectively fixed on the planar substrate, the mover 30 and the three-degree-of-freedom driving leg 40. Firstly, it is assumed that the speed of the planar motor with respect to the coordinate system of the planar substrate is obtained according to the following formula (1):

$$V_m^b = [\dot{x}_m^b \, \dot{y}_m^b \, \dot{\theta}_z^b]^T \qquad (1)$$

then the speed of an $i^{th}$ three-degree-of-freedom driving leg should be shown as the following formula (2) in the respective coordinate system:

$$V_i^i = J_i(\theta_z) V_m^b, i=1,2 \qquad (2)$$

where a Jacobian matrix is as shown in the following formula (3):

$$J_i(\theta_z) = \begin{bmatrix} \cos\theta_z & \sin\theta_z & -y_i^m \\ -\sin\theta_z & \cos\theta_z & x_i^m \end{bmatrix} i = 1, 2 \qquad (3)$$

Figure 23:
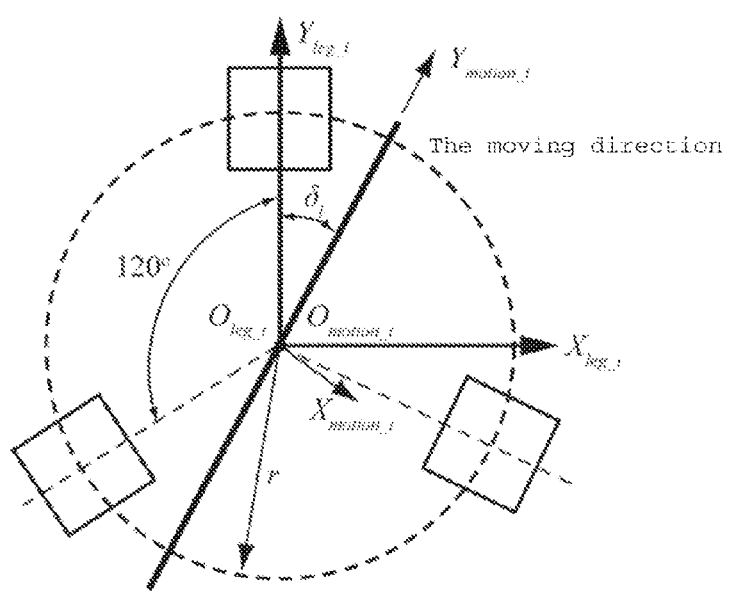
FIG. 23 is a second schematic view of definition of parameters of the three-degree-of-freedom driving leg in the piezo-actuated planar motor of the present invention.

FIG. 23 is a first schematic view of definition of parameters of a three-degree-of-freedom driving leg in the piezo-actuated planar motor of the present invention. FIG. 24 is a second schematic view of definition of parameters of the three-degree-of-freedom driving leg in the piezo-actuated planar motor of the present invention. As shown in FIGS. 23 and 24, the moving head of the $i^{th}$ three-degree-of-freedom driving leg has three degrees of freedom ($\delta_i$, $\Phi_i$, $Z_i$), and is driven by the stretching and retraction of three first piezo actuators. FIGS. 23 and 24 show the definition of variables of the three degrees of freedom. The angle $\delta_i$ defines a plane in which the three-degree-of-freedom moving head moves, referred to as a motion plane, and at the same time, this variable also defines the driving direction of the driving leg. The numerical value of the angle $\delta_i$ is calculated by the above-mentioned formula (2) $V_i^i$. The swinging angle $\Phi_i$ of the moving head of the $i^{th}$ three-degree-of-freedom driving leg and the perpendicular stretching $Z_i$ of the moving head determine the position of said moving head moving in the motion plane. The r as in FIG. 22 is a uniform distribution radius of three first piezo actuators, and then the displacement length of a $j^{th}$ first piezo actuator in the $i^{th}$ three-degree-of-freedom driving leg can be obtained from the following formula (4):

$$d_{ji\_3DOF} = -Z_i - r\cos[120°(j-1)+\delta_i]\Phi_i, j=1,2,3 \; i=1,2 \qquad (4)$$

In particular, in the sliding mode, a contact of the three-degree-of-freedom driving leg 40 can drive the mover 30 under the driving action of three first piezo actuators 43 along an elliptical track 60. The plane in which the elliptical track 60 is located is a motion plane, is decided by a variable $\delta_i$, and changes along with the motion direction. The driving speed of the first piezo actuator 43 here can reach up to hundreds of Hertz, such that the mover 30 can slide at high speed on the planar substrate. The motion control equation of the $j^{th}$ piezo actuator inside the $i^{th}$ three-degree-of-freedom driving leg is as shown in the following formulas (5)-(7):

$$d_{ji\_3DOF} = j_i \cos(2\pi f t + \theta_{ji}) j=1,2,3 \; i=1,2 \qquad (5)$$

$$A_{ji} = \sqrt{r^2 \cos^2[120°(j-1) + a\tan 2(V_i^i)] A_{\Phi\_i}^2 + A_{z\_i}^2} \qquad (6)$$

$$\theta_{ji} = a\tan 2\{-A_{Z\_i}, -r\cos[120°(j-1) + a\tan 2(V_i^i)] A_{\Phi\_i}\} \qquad (7)$$

where $A_{z\_i}$ and $A_{\Phi\_i}$ respectively define the long axis and the short axis of the elliptical track 60, that is, a lifted height with each step of the three-degree-of-freedom driving leg 40 and a sliding step. The lifted height with each step can adjust contact piezo effect between the three-degree-of-freedom driving leg 40 and the planar substrate, and the sliding step can adjust the sliding speed of the mover 30. The driving frequency of the driving leg can be represented by f, and the frequency can also be used to control the sliding speed of the planar motor. The variables are rationally adjusted to obtain motion control of the first piezo actuator inside the three-degree-of-freedom driving leg.

In the walking mode, two three-degree-of-freedom driving legs 40 and two single-degree-of-freedom driving legs 50 work together to drive the mover 30 to advance step by step. The control algorithm of the walking mode of the three-degree-of-freedom driving leg 40 is identical to that in the sliding mode, and the difference is that the walking algorithm uses a lower driving frequency f (usually less than 100 Hz). The control equation of the single-degree-of-freedom driving leg 50 is relatively simple, and the control equation only needs to satisfy the condition that when the three-degree-of-freedom driving leg 40 is lifted and prepares for the next driving, the single-degree-of-freedom driving leg 50 stretches and presses the planar substrate to brake. The $i^{th}$ single-degree-of-freedom driving leg is controlled by the following formula (8):

$$d_{i\_1DOF} = A_i \cdot \cos\left(2\pi f t - \frac{\pi}{2}\right) \ i = 1, 2 \tag{8}$$

In the fine tuning mode, two three-degree-of-freedom driving legs 40 and two single-degree-of-freedom driving legs 50 work together to fine-tune the position of the mover 30 in terms of six degrees of freedom in the space. It is assumed that the adjustment vectors of six degrees of freedom are $\Delta P1_s^b$ and $\Delta P2_s^b$, then the control equation of the first piezo actuator and the second piezo actuator inside the three-degree-of-freedom driving leg 40 and the single-degree-of-freedom driving leg 50 is as shown in the following formulas (9)-(15):

$$d_{i\_1DOF} = [1 y_{i\_1DOF}{}^m - x_{i\_1DOF}{}^m] \Delta P2_s^b i=1,2 \tag{9}$$

$$d_{ji\_1DOF} = -Z_i - r \cos[120°(j-1)+\delta_i]\Delta\Phi_j j=1,2,3 i=1,2 \tag{10}$$

where $$\Delta P1_m^b = [\Delta x_m^b \Delta y_m^b \Delta \theta_z]^T \tag{11}$$

$$\Delta P2_m^b = [\Delta z_m^b \Delta \theta_x \Delta \theta_y]^T \tag{12}$$

$$\delta_i = \alpha \tan 2[J_i(\theta_z)\Delta P1_m^b] \tag{13}$$

$$\Delta \Phi_i = -[J_i(\theta_z)\Delta P1_m^b]/D \tag{14}$$

$$Z_i = [1 y_{i\_3DOF}{}^m - x_{i\_3DOF}{}^m] \Delta P2_m^b \tag{15}$$

In summary, the present invention provides a novel piezo-actuated planar motor used in nano-positioning with a large travel. Said piezo-actuated planar motor uses a vacuum pre-loaded air bearing to reduce movement resistance, while ensuring that the electric motor has a relatively high stiffness. In addition, a plurality of piezo ceramic driving legs (comprising a three-degree-of-freedom driving leg and a single-degree-of-freedom driving leg, or all being three-degree-of-freedom driving legs) are used to drive the planar motor so as to achieve a nano-sized positioning resolution. In addition, said piezo-actuated planar motor has the following three working modes: a sliding mode, a walking mode and a fine tuning mode. In the sliding mode, the planar motor can move fast and is suitable for long-distance movement. In the walking mode, the planar motor can perform stepping motion, the step distance can be adjusted, the movement speed is relatively slow, but has a high positioning accuracy and a high-accuracy tracking capability. In the fine tuning mode, the driving leg stretches to press the substrate and fine-tune the final position of the mover by adjusting the swinging angle of the moving head. The planar motor in the fine tuning mode has the most stable control, and also has a high positioning accuracy. The above-mentioned three working modes can be combined to obtain the advantages of high speed and high positioning accuracy at the same time.

While the particular embodiments of the present invention have been described, a person skilled in the art should understand that these are merely illustrative, and that the scope of protection of the present invention is defined by the appended claims. Various alterations or modifications to these embodiments can be made by a person skilled in the art without departing from the principle and substance of the present invention; however, these alterations and modifications all fall within the scope of protection of the invention.

The invention claimed is:

1. A piezo-actuated planar motor, comprising a planar substrate and a mover installed on said planar substrate, characterized in that said piezo-actuated planar motor further comprises: at least one piezo driving leg which is disposed on said mover so as to drive said mover to move on said planar substrate omnidirectionally in the plane, wherein said at least one piezo driving leg comprises at least one multi-degree-of-freedom driving leg disposed on said mover, and a contact head of said multi-degree-of-freedom driving leg provides the motion of at least two degrees of freedom.

2. The piezo-actuated planar motor of claim 1, characterized in that said planar motor further comprises a levitation device which enables said mover to levitate over said planar substrate.

3. The piezo-actuated planar motor of claim 1, characterized in that said planar motor further comprises a preload mechanism which generates a preload force between said mover and said planar substrate.

4. The piezo-actuated planar motor of claim 1, characterized in that said at least one piezo driving leg further comprises at least one single-degree-of-freedom driving leg disposed on said mover, and a contact head of said single-degree-of-freedom driving leg provides the motion of one degree of freedom.

5. The piezo-actuated planar motor of claim 4, characterized in that said at least one piezo driving leg comprises two multi-degree-of-freedom driving legs and two single-degree-of-freedom driving legs.

6. The piezo-actuated planar motor of claim 4, characterized in that said at least one piezo driving leg comprises three multi-degree-of-freedom driving legs and three single-degree-of-freedom driving legs.

7. The piezo-actuated planar motor of claim 1, characterized in that said piezo-actuated planar motor comprises six multi-degree-of-freedom driving legs.

8. The piezo-actuated planar motor of claim 7, characterized in that said multi-degree-of-freedom driving legs are formed by stacking shear piezo actuators and linear piezo actuators.

9. The piezo-actuated planar motor of claim 7, characterized in that said multi-degree-of-freedom driving leg comprises at least two first piezo actuators which are combined with each other so as to provide the motion of multiple degrees of freedom.

10. The piezo-actuated planar motor of claim 4, characterized in that said single-degree-of-freedom driving leg uses a second piezo actuator, and said second piezo actuator provides the motion of a single degree of freedom.

11. The piezo-actuated planar motor of claim 1, characterized in that motion control modes of said piezo-actuated planar motor include a sliding mode in which said at least one piezo driving leg is in a state not in contact with said planar substrate.

12. The piezo-actuated planar motor of claim 2, characterized in that the motion control modes of the piezo-actuated planar motor include a sliding mode in which said at least one piezo driving leg is in a state not in contact with said planar substrate and in which said mover is in a levitation state.

13. The piezo-actuated planar motor of claim 1, characterized in that the motion control modes of said piezo-actuated planar motor include a walking mode in which at least one piezo driving legs is in contact with said planar substrate at any moment.

14. The piezo-actuated planar motor of claim 1, characterized in that the motion control modes of said piezo-actuated planar motor include a fine tuning mode in which a plurality of said piezo driving legs are adjusted to achieve the fine tuning of the position of the mover while the contact between the plurality of piezo driving legs and said planar substrate remains unchanged.

15. The piezo-actuated planar motor of claim 1, characterized in that said piezo-actuated planar motor further comprises a position feedback system.

16. The piezo-actuated planar motor of claim 15, characterized in that said position feedback system uses a planar encoder or a laser interferometer.

17. The piezo-actuated planar motor of claim 16, characterized in that said planar encoder comprises a reading head and a planar reference component, said planar reference component being installed on said planar substrate;
said reading head being installed on said mover and moving along with said mover, and said reading head being used to acquire information about said planar reference component so as to obtain the position of said mover on said planar substrate.

18. The piezo-actuated planar motor of claim 16, characterized in that said planar encoder comprises a reading head and a planar reference component, said planar reference component being installed on said mover and moves along with said mover, and said reading head being installed on said planar substrate;
and when said mover moves, said reading head being used for acquiring position information about said planar reference component so as to acquire the position of said mover on said planar substrate.

19. A driving method of a piezo-actuated planar motor, characterized in that said piezo-actuated planar motor is as claimed in claim 1, and said driving method drives said mover to move on said planar substrate omnidirectionally in the plane by using said at least one piezo driving leg.

20. The driving method of claim 19, characterized in that said driving method further comprises: levitating said mover over said planar substrate using a levitation device.

21. The driving method of claim 19, characterized in that said driving method further comprises: generating a preload force between said mover and said planar substrate using a preload mechanism.

22. The driving method of claim 19, characterized in that said driving method comprises the following motion control modes: a sliding mode, a walking mode or a fine tuning mode.

23. The driving method of claim 22, characterized in that the system automatically selects a motion control mode according to a distance between a current position and a target position as well as the requirements of mover positioning accuracy.

* * * * *